US006508497B1

(12) United States Patent
Nerger

(10) Patent No.: US 6,508,497 B1
(45) Date of Patent: Jan. 21, 2003

(54) OVERHEAD CLAMP-TYPE GRIPPING DEVICE FOR GRABBING A LOAD

(75) Inventor: Klaus Nerger, Neukirchen-Vluyn (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/478,048

(22) Filed: Jan. 5, 2000

(30) Foreign Application Priority Data

Jan. 11, 1999 (DE) ......................................... 199 01 496

(51) Int. Cl.$^7$ ................................................. B66C 1/44
(52) U.S. Cl. ................ 294/86.4; 294/102.1; 294/119.1; 294/902
(58) Field of Search ........................ 294/62, 63.1, 67.3, 294/67.31, 67.33, 81.6, 81.62, 86.4, 88, 87.1, 90, 99.1, 102.1, 106, 110.1, 114, 117, 118, 119.1, 902, 16, 27.1, 28, 34, 119

(56) References Cited

U.S. PATENT DOCUMENTS

| 2,337,178 A | * 12/1943 | Breslav | .................... 294/119.1 |
| 2,588,276 A | * 3/1952 | Naillon | ................... 294/87.1 X |
| 2,959,446 A | * 11/1960 | Breslav | .................... 294/119.1 |
| 3,199,910 A | * 8/1965 | Bradley | .................... 294/86.4 X |
| 4,261,609 A | * 4/1981 | Kraszewski et al. | ... 294/86.4 X |
| 4,262,952 A | * 4/1981 | Bradley | .................. 294/118 X |
| 4,360,110 A | * 11/1982 | Sigman et al. | ......... 294/119.1 X |
| 5,795,003 A | 8/1998 | Nerger et al. | ................ 294/106 |

FOREIGN PATENT DOCUMENTS

| DE | 26 06 999 A1 | 9/1976 |
| DE | 41 38 648 A1 | 10/1992 |
| DE | 42 35 520 A1 | 4/1993 |
| GB | 1449507 | * 1/1989 | ................. 294/902 |

OTHER PUBLICATIONS

DDZ–Z: Hebezeuge und Fördermittel, Berlin 26 (1986) 3, p. 85.
DDZ–Z: Hebezeuge und Fördermittel 14 (1974) issue 1, p. 20.
DDZ–Z: Hebezeuge und Fördermittel 18 (1978) 9, p. 282.

* cited by examiner

Primary Examiner—Johnny D. Cherry
(74) Attorney, Agent, or Firm—Henry M. Feiereisen

(57) ABSTRACT

An overhead clamp-type gripping device for gripping a load from above, includes a carrier frame which is movable in a vertical direction and has support elements positioned on both sides of a center plane and extending downwards from the carrier frame for movement relative to one another. The support elements have longitudinal guides which define an upwardly open angle with respect to the center plane. Received in the longitudinal guides of the support elements is a gripper unit which includes gripping elements for laterally contacting a load. The gripping elements are movable in load direction from a ready position in which the gripping elements are disposed at an upper end of the longitudinal guides and securable by a locking mechanism, to an active position in which the gripping elements grab the load whereby during lifting of the carrier frame the gripping elements move relative to the support elements in the load direction to thereby automatically apply a clamping action at a clamping force which depends on the weight of the load.

12 Claims, 3 Drawing Sheets

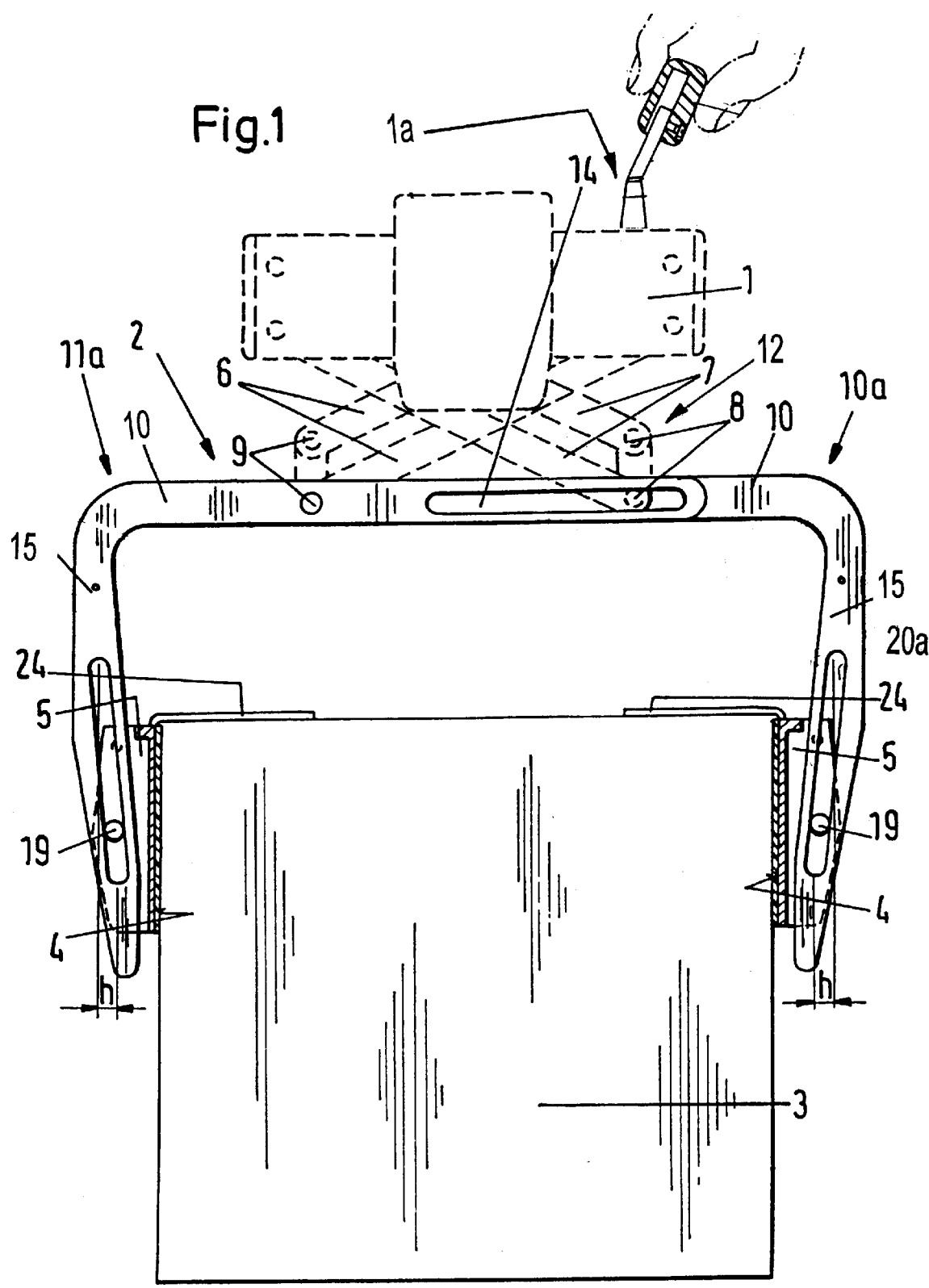

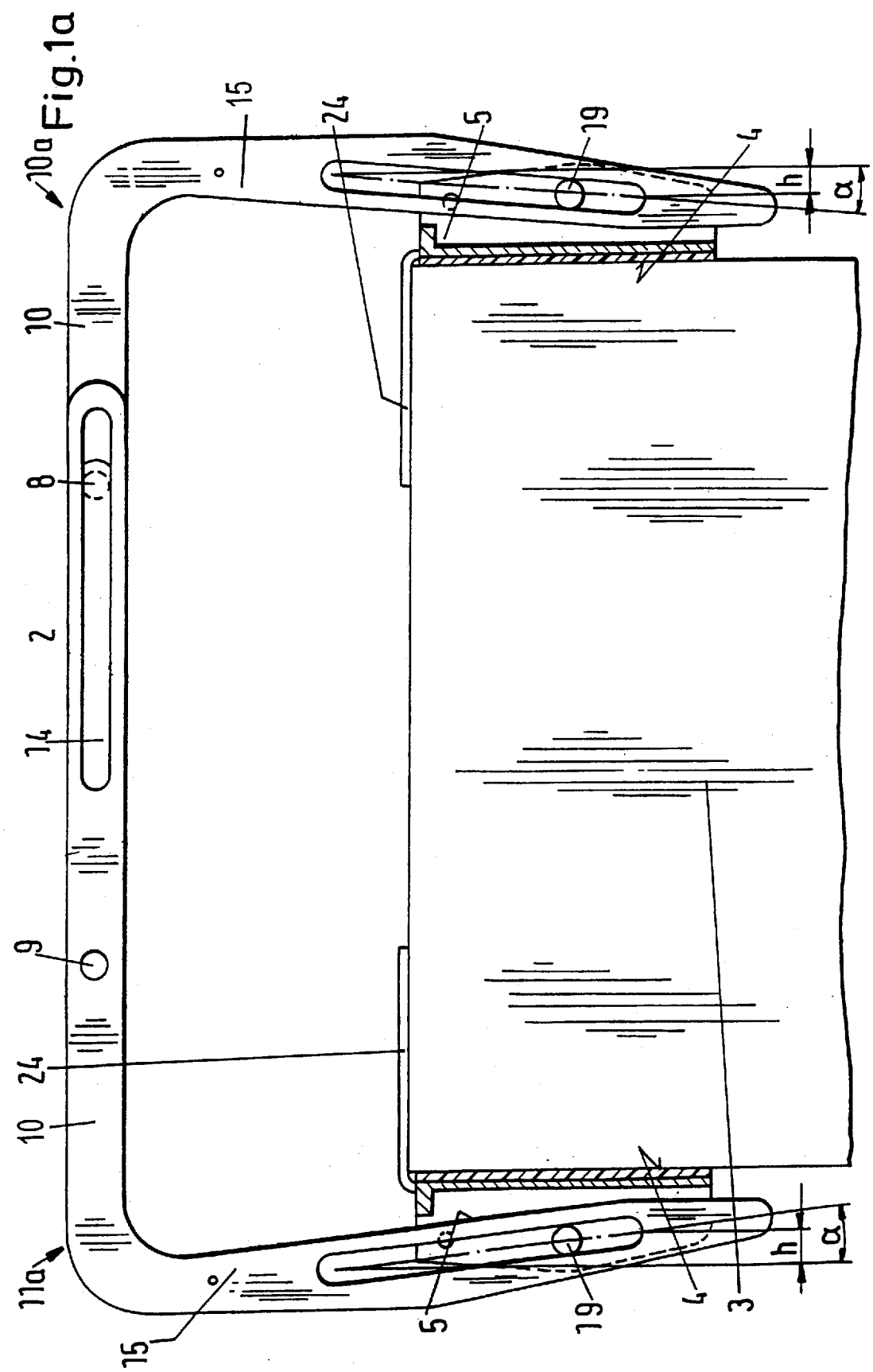

OVERHEAD CLAMP-TYPE GRIPPING DEVICE FOR GRABBING A LOAD

CROSS-REFERENCES TO RELATED APPLICATIONS

This application claims the priority of German Patent Application Serial No. 199 01 496.5, filed Jan. 11, 1999, the subject matter of which is incorporated herein by reference.

BACKGROUND OF THE INVENTION

The present invention relates, in general, to gripping devices for lifting loads, and in particular to an overhead clamp-type gripping device of a type including a carrier frame having attached thereon support elements which are movable relative to one another and carry confronting gripping elements for lateral engagement of a load.

U.S. Pat. No. 5,795,003, issued on Aug. 18, 1998, describes a gripping device of this type for grabbing loads from above. The gripping device is arranged on a hand-guided handling device and includes a carrier frame which can be lowered and lifted via the handling device in a vertical direction. The carrier frame has support elements for attachment of gripping elements which are aligned in substantial parallel relationship to the direction of the vertical axis and move in opposition to one another for lateral engagement of the load. The gripping elements have a configuration that is suited to the load being grabbed so as to grip the load from below in a form-fitting manner. To prevent the load being grabbed from pushing the gripping elements away from one another during transport, the gripping device is provided with a fastening mechanism to lock the gripping elements in place relative to one another.

This conventional gripping device suffers shortcomings as a result of the required grabbing of the load from underneath so that its use is unsuitable for many objects such as e.g. cardboard boxes and the like.

SUMMARY OF THE INVENTION

It is thus an object of the present invention to provide an improved gripping device, obviating the afore-stated drawbacks.

In particular, it is an object of the present invention to provide an improved gripping device which is easy to handle and has a slender configuration while yet being able to reliably grab a load, without gripping the load from underneath.

These objects, and others which will become apparent hereinafter, are attained in accordance with the present invention by providing a carrier frame movable in a vertical direction and having support elements positioned on both sides of the center plane and extending downwards from the carrier frame for movement relative to one another, with the support elements having longitudinal guides which define an upwardly open angle with respect to the center plane; a gripper unit which is received in the longitudinal guides of the support elements and includes gripping elements for laterally contacting a load, with the gripping elements being movable in load direction from a ready position in which the gripping elements are disposed at an upper end of the longitudinal guides and lockable in place by a locking mechanism, to an active position in which the gripping elements grab the load whereby during lifting of the carrier frame the gripping elements move relative to the support elements in the load direction to thereby automatically apply a clamping action with a clamping force which depends on the weight of the load, and by providing a fastening mechanism for permitting securement of a mutually fixed position between the support elements.

In accordance with the present invention, the clamping action of the gripping elements is dependent from the weight force of the load after the gripping elements firmly engage the load, whereby the engagement of the gripping elements is only of such extent as is necessary to accomplish a troublefree grabbing. Handling of the gripping device is easy when restraining the support elements in their movement by means of the fastening mechanism. The gripping device can be operated in a simple manner because the gripping elements can firmly engage a load between them, after the fastening mechanism is released. This can be done automatically, e.g. by utilizing the existing own weights of the load and the carrier frame.

The effectiveness of the gripping device according to the present invention is based on the principle that the weight of the load is utilized to act on the gripping elements so that the gripping elements can be pressed against the sidewalls of the load at a multiple of the weight.

According to another aspect of the present invention, the gripping elements swing about a pin which defines a horizontal pivot axis extending perpendicular to the longitudinal guides and parallel to the center plane, thereby accomplishing an even engagement of the gripping elements on the load. The clamping action can be further enhanced when providing pairs of longitudinal guides in opposite disposition.

In accordance with a simple embodiment of the gripping device, two longitudinal guides are provided which extend at an upwardly open spread angle relative to one another, with each of the two longitudinal guides supporting a gripping element whereby the two gripping elements have plate-shaped gripping areas in confronting disposition. Depending on the configuration of the carrier frame, the gripping areas of the gripping elements may face one another with or without lateral offset. The longitudinal guides are each formed as an elongate slot which is engaged by the pin of the pertaining gripping element. Suitably, both gripping elements define in their ready position an upwardly open spread angle and are held in this position by the locking mechanism, to ensure a smooth operation of the gripping device. A simple embodiment proposes the use of a spring force for holding the gripping elements in their ready position. An example may include spring-loaded locking members by which the gripping elements are cleared to pivot from their ready position only after a predetermined force is applied which overcomes the spring force exerted on the locking member.

According to another feature of the present invention, the load can be easily grabbed when the gripping device is so configured that the gripping elements are automatically forced into flat engagement with the sidewalls of the load before lifting the load, whereby the force is dependent on the weight of the carrier frame. Thus, the engagement and the load weight dependent clamping action are separated in time from one another. Engagement of the gripping elements can be realized in a simple manner by mounting the support elements to arms which are guided in the carrier frame for linear movement in horizontal direction in opposition to one another to thereby form a horizontal support.

According to another feature of the present invention, the support unit is realized by two angles having a horizontal arm forming the horizontal carrier and a vertical arm forming the support element. This configuration results in a stable and structurally simple configuration of the carrier frame.

Pickup and placement of the load as well as movement of the gripping elements in their ready position can be easily implemented when providing the gripping elements with horizontal brackets for engagement with the load when the carrier frame is positioned on the load.

BRIEF DESCRIPTION OF THE DRAWING

The above and other objects, features and advantages of the present invention will be more readily apparent upon reading the following description of a preferred exemplified embodiment of the invention with reference to the accompanying drawing, in which:

FIG. 1 is a front elevation view of a clamp-type gripping device according to the present invention during lifting of a load;

FIG. 1a is a front elevation view, on an enlarged scale, of the clamp-type gripping device.

DETAILED DESCRIPTION OF PREFERRED EMBODIMENTS

Figure 2:
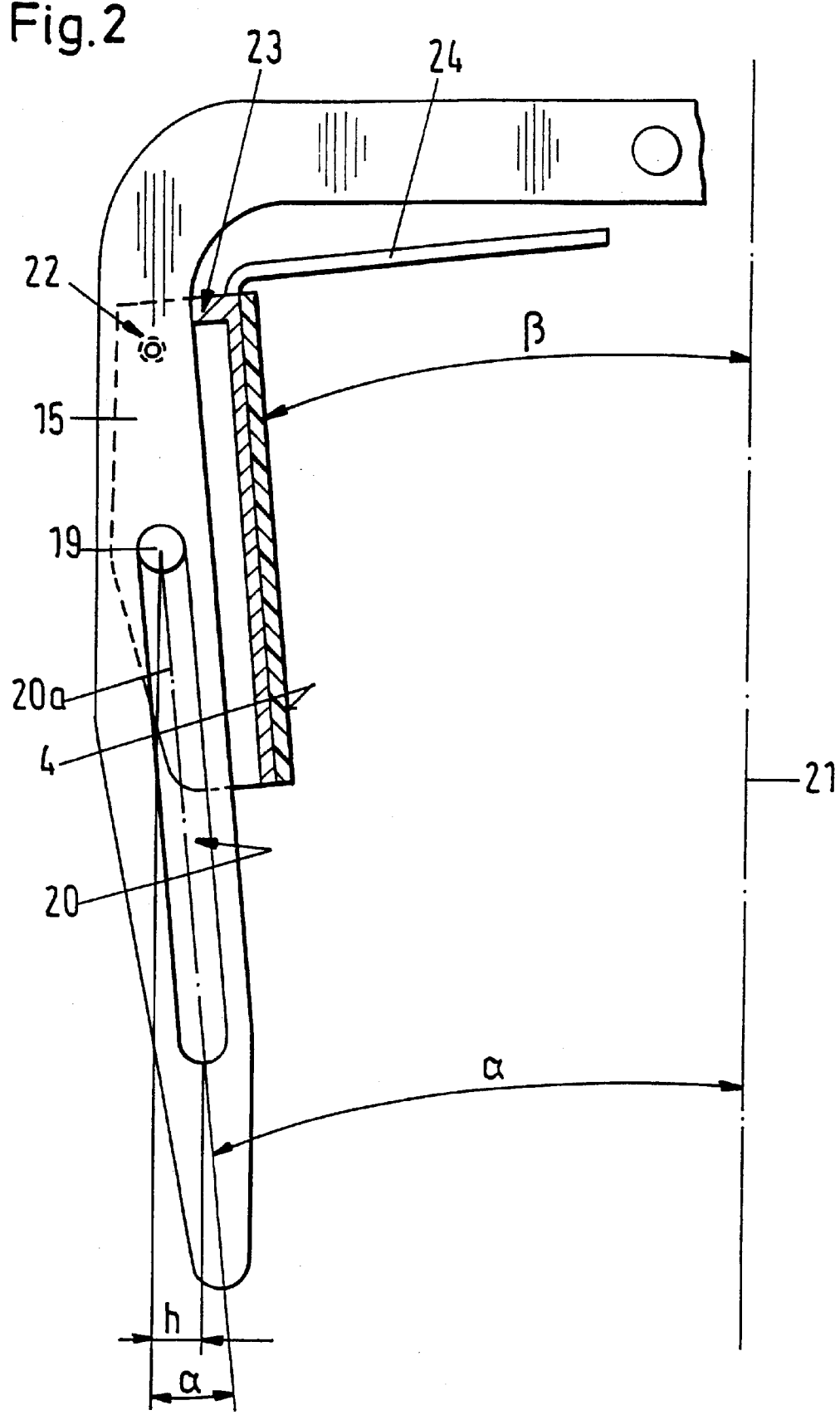
FIG. 2 is a cutaway view of a vertical support element with attached gripping element in ready position before engagement of a load.

Throughout all the Figures, same or corresponding elements are generally indicated by same reference numerals.

Turning now to the drawing, and in particular to FIG. 1, there is shown a front elevation view of an overhead clamp-type gripping device according to the present invention during lifting of a load 3. The gripping device includes a handling unit 1 which can be manipulated by hand and is connected via a parallel bars linkage, generally designated by reference numeral 12, to a carrier frame, generally designated by reference numeral 2, for movement in a vertical direction to thereby permit lifting and lowering of the load 3. The carrier frame 2 has a generally inverted U shaped configuration and supports a gripper in the form of a pair of jaw-like gripping elements 5 in confronting disposition for grabbing opposite sidewalls of the load 3, for example a cardboard box. The gripping elements 5 include gripping areas 4 in the form of plate-shaped flat friction surfaces by which the load 3 is grabbed from both sides.

The bars linkage 12 for connecting the carrier frame 2 to the handling unit 1 includes a first pair of parallel bars 6 and a second pair of parallel bars 7 in crosswise disposition. The pairs of bars 6, 7 have one end articulated to the handling unit 1. With their other end, the bars 6 are articulated to hinge bolts 9 in superimposed disposition, whereas the bars 7 are articulated at their other ends to hinge bolts 9 in superimposed disposition. Thus, the linkage 12 forms two parallelogram guide mechanisms for connecting the handling unit 1 to the carrier frame 2.

As shown in particular in FIG. 1a which is a front elevation view, on an enlarged scale, of the gripping device, the carrier frame 2 includes a pair of angles 10a, 11a of generally identical configuration which extend parallel next to one another and move in opposition to each another. Each of the angles 10a, 11a includes a horizontal arm 10 which is formed with an oblong guide slot 14 (only the guide slot 14 in arm 10 of angle 11a is visible in the illustration of FIGS. 1 and 1a). Engaging the guide slot 14 of the angle 11a is the lower one of the hinge bolts 8 which is rotatably mounted to the horizontal arm 10 of the angle 10a and the lower one of the bars 7 whereas the guide slot 14 of the angle 10a is engaged by the lower one of the hinge bolts 9 which is rotatably mounted to the horizontal arm 10 of the angle 11a and the lower one of the bars 6. Thus, the arms 10 of the angles 10a, 11a can move back and forth relative to one another to provide a horizontal guide mechanism for the carrier frame 2. Although not shown in detail in the drawing, the carrier frame has incorporated therein a fastening mechanism by which the arms 10 of the angles 10a, 11a can suitably be secured in a mutually fixed position by a fastening mechanism before lifting the load 3 and after placement of the load 3. An example for a suitable fastening mechanism includes a locking nut which is screwed onto a complementary thread of the lower hinge bolt 8 until the arms 10 press against one another to effect a frictional engagement. Another example of a fastening mechanism includes a hand-actuated clamping lever 1a (FIG. 1). A preferred embodiment includes the provision of a form-fitting fastening mechanism which includes a block in which the lower hinge bolt 8 is received and which can be brought into interlocking engagement with a rack and released therefrom through actuation of an operating handle. A specific construction and manner in which the fastening mechanism is operatively and functionally incorporated into a gripping device of the present invention is fully described in U.S. Pat. No. 5,795,003, the entire specification and drawings of which are expressly incorporated herein by reference.

Through the configuration of the linkage 12 and its attachment to the carrier frame 2, the arms 10 of the angles 10a, 11a automatically are pushed toward one another after release of the carrier frame 2 by the fastening mechanism as a consequence of the own weight of the carrier frame 2 and the gripping elements 5 during elevating of the handling unit 1 and before elevating the carrier frame 2 and the gripping elements 5.

Each of the angles 10a, 11a further includes a vertical arm 15 which extends vertically downwards from the horizontal arm 10 to form a vertical support element of the carrier frame 2 for attachment of the gripping elements 5. The support element 15 includes a slot 20a which forms part of a longitudinal guide 20 for the gripping element 5. The other part of the longitudinal guide 20 is formed by a pin 19 for engagement in the slot 20a. The pin 19 extends perpendicular to the length direction of the slot 20a and is swingably mounted to the gripping element 5 to define a pivot axis about which the gripping element 5 can rotate. The gripping elements 5 are substantially aligned in parallel relation to a vertical axis and movable toward one another by the swingable connection thereof with the support elements 15 of the carrier frame 2, as shown in FIGS. 1 and 1a. After the support elements 15 are pushed together, both gripping elements 5 are in flat engagement with sidewalls of the load 3 at a force which is commensurate with the weight of the carrier frame 2 and the gripping elements 5.

The force by which the gripping elements 5 engage the load 3 before the load 3 is elevated is determined by the slanted disposition of the bars 6, 7 and the weight dimension of the carrier frame 2 including the gripping elements 5. The contact pressure, as known per se, is governed by dividing the contact force by the gripping area 4 of the gripping elements 5.

Turning now to FIG. 2, there is shown a cutaway view of the angle 11a, with the attached gripping element 5 occupying the initial ready position before a load is grabbed. With respect to the center plane 21 of the carrier frame 2, the slot 20a and thus the longitudinal guide 20 extend at an upwardly open (obtuse) angle $\alpha$, i.e. slantingly upwards so that the longitudinal guides 20 for the gripping elements 5 define together an upwardly open angle 2α in symmetry to the center plane 21. In the ready position, the gripping element 5 is moved to an uppermost disposition with respect to the slot 20a. During lifting of the load 3, the gripping elements 5 are pulled downwards by the load 3 from the ready position and apply a respective clamping action as a consequence of the relative slanted configuration between the longitudinal guides 20. Immediately after lifting the load 3, the support elements 15 are locked in place relative to one another by the fastening mechanism.

Although not shown in detail, it is certainly conceivable to provide several longitudinal guides 20 and several gripping elements 5 in neighboring disposition, with the longitudinal guides 20 extending in a same plane on both sides of the vertical center plane 21 and with both planes defining an upwardly open spread angle 2α, as described above.

In the nonlimiting example of FIG. 1, two longitudinal guides 20 are provided on opposite sides of the center plane 21, with the gripping elements 5 being slightly laterally offset to one another in the direction of the pivot axis 19 as a result of the adjacent disposition of the arms 10 of the angles 10a, 11a. It will be appreciated by persons skilled in the art that the gripping elements 5 may certainly be positioned without such offset, for example by a telescopic arrangement of the arms 10.

Referring again to FIG. 2, it can be seen that the gripping area 4 of each gripping element 5 extends in the ready position with respect to the center plane 21 at an upwardly open spread angle β which in the nonlimiting example, shown here, corresponds to the angle α. However, it will be appreciated by persons skilled in the art that the spread angle β may certainly be different from the angle α.

In the ready position, the gripping elements 5 are held in place by suitable locking members which are indicated schematically in FIG. 2 by reference numeral 22. The locking members 22 are so configured as to release the gripping elements 5 after application of a predetermined force and automatically secure the gripping elements 5 in place relative to one another upon return to the ready position. In the nonlimiting example of the drawing, the locking member 22 for the gripping element 5 includes a spring-loaded sphere (not shown) and a depression (not shown) which complements the spherical configuration of the sphere. When the gripping element 5 is pressed against the load 3 and exceeds the spring force applied on the sphere, the sphere is pushed out of the depressions to permit the gripping element 5 to swing against the sidewall of the load 3.

FIG. 2 also shows that each gripping element 5 is provided with a stop edge 23 which bears against the support element 15 in the ready position, and with a bracket 24 which juts out from the top of the gripping element 5 and engages the load 3 when the carrier frame 2 with the gripping device is placed on the load, 3 whereby the brackets 24 extend horizontal when grabbing the load 3, as illustrated in FIGS. 1 and 1a.

The gripping device operates as follows: At commencement of a grabbing procedure for lifting a load 3, the carrier frame 2 with the gripping elements 5 is lowered from an overhead position onto the load 3. Both vertical support elements 15 are pushed apart to such an extent that the clear distance between the gripping areas 4 exceeds the width of the load 3, whereupon the arms 10 and thus the support elements 15 are locked in place by the fastening mechanism, e.g. through actuation of the operating handle. The gripping elements 5 are held by locking elements 22 in the ready position in which the gripping elements 5 extend at the upwardly open angle 2α relative to one another, whereby the distance between the bottom edges of the confronting plate-shaped gripping areas 4 of the gripping elements 5 is smaller than the distance between their top edges, as is shown in FIG. 2. After placement of the gripping device over the load 3, the locked connection of the arms 10 is released whereby the brackets 24 rest upon the load 3. As the gripping device is now lifted, in the initial phase, the support elements 15 move automatically toward one another until the gripping areas 4 of the gripping elements 5 firmly engage the sidewalls of the load 3 which is not yet elevated from the support surface. During this initial phase, the gripping elements 5 move from their ready position, in opposition to the applied spring force, to swing to an active position in which the gripping areas 4 are in alignment with the sidewalls of the load 3 and extend parallel thereto, as shown in the nonlimiting example of FIG. 1. Once, the load 3 is grasped firmly by the gripping elements 5, the arms 10 are locked in place by the fastening mechanism. Due to the friction force between the gripping areas 4 and the sidewalls of the load 3, the gripping elements 5 are shifted further downwards along their longitudinal guide 20 as the gripping device is raised further. As the longitudinal guides 20 are inclined at the angle a with respect to the center plane 21, the gripping elements 5 are pressed against the load 3 and carry out a clamping action in proportional relation to their displacement. For safety reasons, the resiliency of the load 3, e.g. of a cardboard box, should always be smaller than the clamping action.

The carrier frame 2 and the gripping elements 5 are so configured that an engagement of the pins 19 against the lower end of the longitudinal guides 20 is averted as this would prevent a weight-proportional increase of the clamping force. Reference h designates the distance between minimum and maximum opening angle of the gripping elements 5, whereby in FIG. 1, the gripping elements 5 are positioned closer to one another in the load-clamping position than in the ready position, shown in FIG. 2.

After the gripping elements 5 apply a full clamping force upon the load 3, and the arms 10 of the carrier frame 2 are locked in place, the load 3 can be lifted and transferred without stoppage to the desired site. After placement of the load at the desired site, the fastening mechanism is released to allow a withdrawal of the gripping device from the load 3, without interference by the gripping elements 5. After release of the arms 10 and thus of the support elements 15, the gripping elements 5 move upwards by the own weight of the carrier frame 2 via the brackets 24. The pressure onto the underside of the brackets 24 effects an outward swinging of the gripping elements 5 until the stop edge 23 bears against the inside of the support elements 15. The stop edge 23 of both gripping elements 5 then slides slantingly upwards along the inside surfaces of the support elements 15 until the pins 19 rest against the upper end of the longitudinal guides 20, and the locking members 22 lock the gripping elements 5 in place, i.e. the spheres engage the respective depressions. Subsequently, the support elements 15 are locked in place again by the fastening mechanism.

Persons skilled in the art will understand that the support elements 15 and the gripping elements 2 can be locked by the fastening mechanism in any desired intermediate position, so that loads 3 can be placed even in relatively narrow packages or other tight areas, without any need to completely open the gripping device after placement of the load. In these situations, the free space between the load 3 and the package determines the opening path of the gripping device.

When loads of different sizes are to be lifted, the gripping device is placed on the top surface of a larger load 3. The lower end of the gripping elements 5 is thereby suitably rounded or includes a freely rotatable sphere so that the support elements 15 can slide over the top surface of the load while moving outwards to thereby automatically "take measurements". Or, the gripper is placed every time on a bottom surface or placed on a load of the same size for taking measurements.

While the invention has been illustrated and described as embodied in an overhead clamp-type gripping device for grabbing a load, it is not intended to be limited to the details shown since various modifications and structural changes may be made without departing in any way from the spirit of the present invention.

What is claimed as new and desired to be protected by letters patent is set forth in the appended claims:

What is claimed is:

1. A gripping device for gripping a load, comprising:

a carrier frame defining a vertical center plane and movable in a vertical direction, said carrier frame having support elements positioned on both sides of the center plane and extending downwards from the carrier frame for movement relative to one another, said support elements having longitudinal guides which define an upwardly open angle with respect to the center plane;

a gripper unit received in the longitudinal guides of the support elements and including gripping elements for lateral engagement of a load, said gripping elements swingable about horizontal pivot axes in parallel relationship and being movable in a direction of the load from a ready position in which the gripping elements are disposed at an upper end of the longitudinal guides at an upwardly open spread angle, to an active position in which the gripping elements grab automatically the load as a result of the own weight of the carrier frame and the gripping elements, wherein the gripping elements have horizontal brackets for moving the gripping elements to their ready position, when the carrier frame is placed upon the load, whereby during lifting of the carrier frame the gripping elements move relative to the support elements in the load direction to thereby automatically apply a clamping action at a clamping force which depends on the weight of the load;

a fastening mechanism for permitting securement of a mutually fixed position between the support elements; and a locking mechanism for applying a force on the gripping elements to hold the gripping elements in the ready position.

2. The gripping device of claim 1 wherein the gripping elements are for forced engagement of the load positioned between the gripping elements, when the fastening mechanism is released.

3. The gripping device of claim 1 wherein the pivot axes extend perpendicular to the longitudinal guides and parallel to the center plane.

4. The gripping device of claim 1 wherein the gripping elements form a pair in confronting disposition.

5. The gripping device of claim 1 wherein the carrier frame has two such longitudinal guides which extend at an upwardly open spread angle, each of said longitudinal guides supporting a one of said gripping elements, with said gripping elements exhibiting plate-shaped gripping areas in confronting disposition.

6. The gripping device of claim 5 wherein the gripping areas are arranged at lateral offset relative to one another.

7. The gripping device of claim 1 wherein the longitudinal guides are each configured as an elongate slot for engagement of the pin of the gripping element.

8. The gripping device of claim 1 wherein the locking mechanism includes a locking member for each of the gripping elements for holding the gripping elements in their ready position.

9. The gripping device of claim 1 wherein the gripping elements, before lifting the load, move automatically into flat engagement with sidewalls of the load and apply a force which is dependent from a weight of the carrier frame.

10. The gripping device of claim 1 wherein the carrier frame includes means which are movable in a linear direction relative to one another via a horizontal guide and form a horizontal support for the support elements.

11. The gripping device of claim 10 wherein the means includes two angles having a horizontal arm to form the horizontal support and a vertical arm to form the support elements.

12. The gripping device of claim 1 wherein the gripping elements have horizontal brackets for moving the gripping elements to their ready position, when the carrier frame is placed upon the load.

* * * * *